C. E. PIERSON.
FISHHOOK.
APPLICATION FILED MAY 22, 1920.
1,381,003.
Patented June 7, 1921.
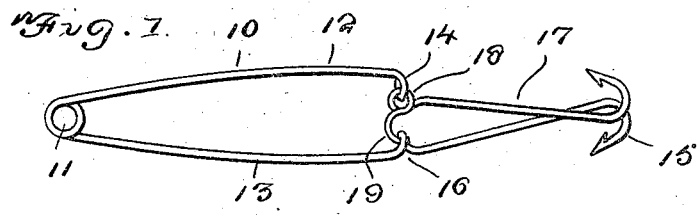
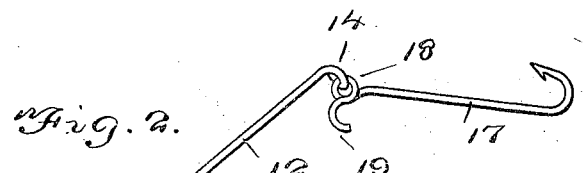
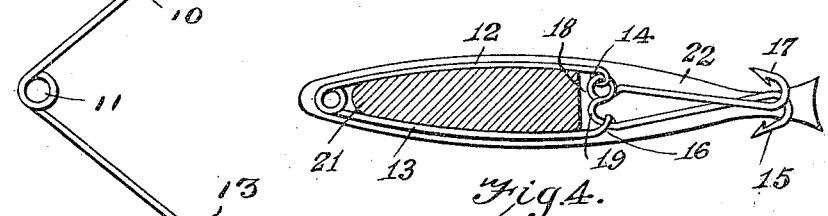
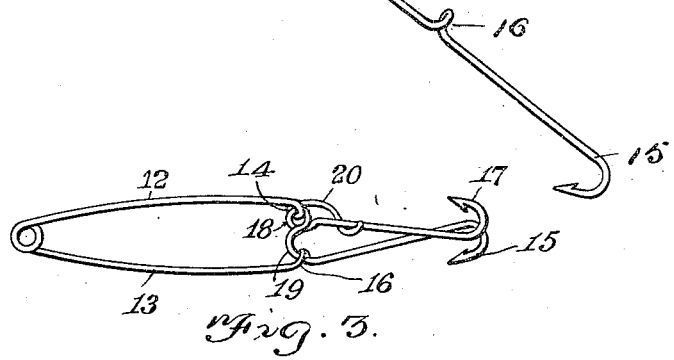
C. E. Pierson
INVENTOR
BY Victor J. Evans
ATTORNEY
WITNESS:

UNITED STATES PATENT OFFICE.

CHARLES E. PIERSON, OF NEWCASTLE, INDIANA.

FISHHOOK.

1,381,003.

Specification of Letters Patent.

Patented June 7, 1921.

Application filed May 22, 1920. Serial No. 383,535.

*To all whom it may concern:*

Be it known that I, CHARLES E. PIERSON, a citizen of the United States, residing at Newcastle, in the county of Henry and State of Indiana, have invented new and useful Improvements in Fishhooks, of which the following is a specification.

This invention relates to fish hooks and has for its object the provision of a spring fish hook which is normally in contracted position but which is capable of springing outwardly whereby to catch a fish while nibbling, the device having a trigger which holds the parts in set position and which is released to spring the device in the event of a nibble or bite, a distinct advantage of the structure being that the springing apart of the hook members will cause the hooks to engage within the mouth of the fish so that he cannot possibly escape.

An important object is the provision of a device of this character which is formed of only two parts and which will therefore be extremely simple and inexpensive in manufacture and which will yet at the same time be highly efficient in action, durable in service, and a general improvement in the art.

With the above and other objects and advantages in view, the invention consists in the details of construction to be hereinafter more fully described and claimed, and illustrated in the accompanying drawings in which—

Figure 1 is a perspective view of the device in set position,

Fig. 2 is a similar view showing it in sprung position;

Fig. 3 is a view of a modification, and

Fig. 4 is a view of another modification.

Referring more particularly to the drawings, the numeral 10 designates the body of the device which is formed from a single length of wire bent intermediate its ends and looped, as shown at 11, to provide normally divergent spring arms 12 and 13, the former of which is relatively short and terminates in an eye 14 which is disposed in a plane at an angle to the arm. The terminal of the arm 13 is formed into a hook 15 which has, of course, the usual barb and which is of exactly the same formation as any well known fish hook. Intermediate its ends the arm 13 is formed with a loop 16 for a purpose to be described.

Associated with the arm 12 is a hook 17 having the usual barb and formed with a loop or eye 18 engaged within the eye 14. At its terminal this hook is formed with a hook-like catch 19.

In the use of the device the arms 12 and 13 are pressed together and the catch 19 engaged within the loop 18 whereupon the arms will be held in their contracted position. Before the device is set it is observed that the hooks may be provided with any suitable bait though it is probable that the use of the device would be possible in connection with artificial bait. When the device is thus set and the fish nibbles on or bites upon it, or both of them together, the hook 17 will be moved to a certain extent and this will result in disengagement of the catch 19 from the loop 18 and the hooks 15 and 17 will then be permitted to spring apart by virtue of the inherent resilience of the wire from which the device is formed and as these hooks fly outwardly they will effectually engage and hook within the mouth of a fish and prevent any possibility of its escape.

It may be found advisable to form the terminal of the arm 12 with a laterally extending curved portion 20 engageable by the pivoted hook when the arms fly apart and serving as a stop whereby to limit the outward movement of the loosely swinging hook.

If desired, I may use in connection with my hook structure, a body 21 formed as shown in the representation of a fish and longitudinally slotted at 22 for disposition of the hook structure therein. When the device is set, only the hooks 15 and 17 will be exposed behind the tail of the body. The operation is of course the same.

From the foregoing description and a study of the drawings it will be apparent that I have thus provided a very simply constructed and inexpensive hook which is designed to avoid the annoyance caused by the nibbling of fish and which will be highly effective in making a catch when other means would fail.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A fish hook comprising a length of wire bent intermediate its ends and looped to provide normally divergent spring arms, an eye formed at the end of one arm, a loop formed intermediate the ends of the other arm, said second named arm having its terminal portion bent and formed as a fish hook, a hook having a loop engaging within the eye at the end of the first mentioned arm and formed with a hook-like terminal engaging within said second named loop whereby to hold the arms toward each other in contracted position.

2. A fish hook comprising a length of wire bent intermediate its ends and looped to provide normally divergent spring arms, an eye formed at the end of one arm, a loop formed intermediate the ends of the other arm, said second named arm having its terminal portion bent and formed as a fish hook, a hook having a loop engaging within the eye at the end of the first mentioned arm and formed with a hook-like terminal engaging within said second named loop whereby to hold the arms toward each other in contracted position, and a guard at the extremity of said first named arm engageable with the hook carried thereby whereby to limit outward swinging thereof.

3. A fish hook comprising a length of wire bent intermediate its ends and looped to provide normally divergent spring arms, an eye formed at the end of one arm, a loop formed intermediate the ends of the other arm, said second named arm having its terminal portion bent and formed as a fish hook, a hook having a loop engaging within the eye at the end of the first mentioned arm and formed with a hook-like terminal engaging within said second named loop whereby to hold the arms toward each other in contracted position, and a body formed as the representation of a bait and longitudinally slotted to permit movement of said arms.

In testimony whereof I affix my signature.

CHARLES E. PIERSON.